(12) United States Patent
Senouci et al.

(10) Patent No.: US 8,270,347 B2
(45) Date of Patent: Sep. 18, 2012

(54) PROCESS FOR ROUTING DATA PACKETS IN A MOBILE NODE NETWORK AND ASSOCIATED TERMINAL

(75) Inventors: Sidi-Mohammed Senouci, Perros Guirec (FR); Moez Jerbi, Lannion (FR); Rabah Meraihi, Versailles (FR)

(73) Assignee: France Telecom, Paris (FR)

( * ) Notice: Subject to any disclaimer, the term of this patent is extended or adjusted under 35 U.S.C. 154(b) by 936 days.

(21) Appl. No.: 12/302,265

(22) PCT Filed: May 15, 2007

(86) PCT No.: PCT/FR2007/051279
§ 371 (c)(1),
(2), (4) Date: Nov. 24, 2008

(87) PCT Pub. No.: WO2007/135321
PCT Pub. Date: Nov. 29, 2007

(65) Prior Publication Data
US 2009/0274093 A1    Nov. 5, 2009

(30) Foreign Application Priority Data
May 24, 2006   (FR) ..................................... 06 04737

(51) Int. Cl.
*H04W 4/00* (2009.01)
*H04B 7/005* (2006.01)
(52) U.S. Cl. ....................................... 370/328; 370/278
(58) Field of Classification Search .................. None
See application file for complete search history.

(56) References Cited

U.S. PATENT DOCUMENTS
2004/0190476 A1 * 9/2004 Bansal et al. ................. 370/338
2005/0152318 A1 * 7/2005 Elbatt et al. ................... 370/338
(Continued)

FOREIGN PATENT DOCUMENTS
WO    WO 99/46899         9/1999
(Continued)

OTHER PUBLICATIONS
M.Mauve, J.Widmer, H.Hartenstein. "A Survey on Position-Based Routing in Mobile Ad Hoc Networks", IEEE Net., Nov./Dec. 2001, pp. 30-39.*
(Continued)

*Primary Examiner* — Nishant B Divecha
*Assistant Examiner* — Andrew Oh
(74) *Attorney, Agent, or Firm* — Cozen O'Connor

(57) ABSTRACT

A method of routing data packets (P) between a source node (S) and a target node (C) in an ad hoc network comprising mobile nodes (1-14) that can be located and moving on traffic routes (L1, L2, L3, C1, C2, C3) of a particular geographical network (10) forming between them a plurality of intersections (I1-I6). This method comprises a destination intersection selection step in which a carrier node (S) of the packets (P) selects a destination intersection (12) from neighbor intersections and according to traffic conditions; a step of seeking one or more neighbor mobile nodes (1) of the packet carrier node nearer the selected destination intersection (12) than the carrier node; and, if one or more neighbor mobile nodes (1) are found, a step of transferring the packets (P) from the packet carrier node (S) to the neighbor node (1) that has been found, so as to route the data packets to the selected destination intersection.

9 Claims, 6 Drawing Sheets

U.S. PATENT DOCUMENTS

| | | | |
|---|---|---|---|
| 2006/0045065 A1* | 3/2006 | Kim et al. | 370/351 |
| 2006/0062175 A1* | 3/2006 | Ling et al. | 370/328 |
| 2006/0153157 A1* | 7/2006 | Roh et al. | 370/338 |
| 2008/0192672 A1* | 8/2008 | Touchard et al. | 370/315 |

FOREIGN PATENT DOCUMENTS

| | | |
|---|---|---|
| WO | WO 02/067510 | 8/2002 |

OTHER PUBLICATIONS

C. Lochert et al., "A routing strategy for vehicular ad hoc networks in city environments", Intelligent Vehicles Symposium, 2003, Proceedings, pp. 156-161, Jun. 9, 2003.

* cited by examiner

PROCESS FOR ROUTING DATA PACKETS IN A MOBILE NODE NETWORK AND ASSOCIATED TERMINAL

RELATED APPLICATIONS

This is a U.S. National Phase Application under 35 USC §371 of International Application PCT/FR2007/051279, filed on May 15, 2007.

This application claims the priority of French application no. 06/04737 filed on May 24, 2006, and the content of which is hereby incorporated by reference.

BACKGROUND OF THE INVENTION

The field of the invention is that of ad hoc communications networks.

Ad hoc communications networks use the radio medium. They consist of mobile and/or fixed nodes that have the property of automatically and dynamically constituting a network capable of routing packets from any point of the network to any other point of the network after radio communication is set up between a node and its neighbors.

In an ad hoc network, packets are transmitted between the source node and the destination node either directly if the destination node is in the connectivity area of the source node or via intermediate neighbor nodes if the destination node is out of range of the source node.

Consequently, ad hoc networks enable instantaneous deployment of communications networks with no pre-existing infrastructure and no centralized control. The network is formed dynamically, all management tasks being divided between all nodes of the network.

The main feature of ad hoc networks is that the nodes of the network serve or can serve as routers. The nodes themselves are therefore responsible for setting up and maintaining continuous network connectivity using specific routing protocols that enable exchange of routing information between neighbor nodes and enable the nodes of the network to calculate communication paths to all the other nodes. These routing protocols send messages periodically to update the topology of the ad hoc network, i.e. to identify the nodes and the links between them.

To be more precise, the invention relates to a routing method of transmitting data packets between a source node and a target node of an ad hoc network formed by mobile nodes moving on traffic routes of a particular geographical network between which intersections are formed, the nodes being used as carriers for routing data packets to the target node.

The invention finds a special but non-limiting use in vehicular ad hoc networks (VANET) and in urban environments.

Urban vehicular ad hoc networks are distributed and flexible intervehicular communication (IVC) wireless communications systems in which the communication nodes are vehicles moving along routes of a road network of known structure.

In such systems, each vehicle is equipped with short-range wireless transmission means enabling it to send and receive radio-frequency signals and thus to form, in conjunction with other vehicles, a temporary communications network.

In these networks, data packets are routed from a source vehicle to a target vehicle using a routing protocol whereby the data packets are successively forwarded by one or more vehicles moving on the routes of the road network between the source vehicle and the target vehicle.

Most existing routing protocols are based on geographical routing that exploits local information concerning the explicit geographical position of the nodes of the network in order to take decisions regarding transfer of data packets.

A first routing protocol known as the GSR (Geographic Source Routing) protocol bases routing on the geographical position of the nodes of the ad hoc network correlated with information relating to the topology of the network.

According to the GSR protocol, a source vehicle seeking to send a data packet to a target vehicle calculates the shortest routing path to reach the target vehicle based on geographical information from a road map. Note that the routing path in question is calculated in its entirety, for example using the Djikstra algorithm.

On the basis of the calculated routing path, the source vehicle then selects a sequence of intersections through which the data packet must pass in transit to reach the target vehicle. This set of intersections consists of a set of fixed geographical points through which the data packet is to pass.

Thus a complete sequence of fixed geographical points must be calculated before sending each packet to a target vehicle, this sequence then being inserted into the header of a packet to be sent to the target vehicle.

A drawback of the GSR protocol is that the sequence of intersections selected can include roads on which there are too few vehicles to provide a good connection, which has the harmful effect of increasing the packet loss rate.

The insertion of this kind of sequence represents an additional load on the ad hoc network, given that it must be inserted into the header of every packet sent to a target vehicle. Consequently, this kind of approach is disadvantageous in that it cannot optimize the bandwidth allocated to the ad hoc network.

Moreover, it should be noted that the step of determining the entire routing path for reaching the target vehicle is a greedy operation in terms of computation resources. This operation being carried out only at the source node, the GSR protocol does not provide for tracking the evolution of a moving target vehicle.

This can induce a relatively long latency time between a source vehicle sending a packet and a target vehicle receiving it.

When the routing path has been established, the data packet is forwarded successively from node to node along that path using a forwarding strategy known as "Greedy Forwarding".

According to this forwarding strategy, a carrier node of a packet always seeks to forward that packet to a neighbor node that is nearer the target vehicle than the carrier node itself. As soon as the data packet is received, the neighbor node in turn becomes a carrier node that in turn seeks to forward the packet to a neighbor node, and so on.

However, this forwarding strategy can fail in the particular situation where no neighbor node of the carrier node is nearer the target node than the carrier node itself. This situation is known as a "local optimum" situation and requires a recovery solution.

The A-STAR (Anchor-based Street and Traffic Aware Routing) protocol is specifically designed for intervehicular communications networks in urban environments and differs from the GSR protocol in that it takes road traffic data into account when it calculates a routing path. This traffic data is static (for example based on statistics), however, and is not suitable for an urban network in which road traffic is constantly evolving over time. In particular, existing routing protocols in the context of intervehicular communication do not at present take into account space and time variations in road traffic density or the presence of multidirectional routes.

SUMMARY OF THE INVENTION

One aspect of the present invention is directed to a method of routing one or more data packets between a source node and a target node in an ad hoc network comprising a plurality of mobile nodes moving on traffic routes of a particular geographical network forming between them a plurality of intersections. This method includes:
- a step of a carrier node of a data packet to be routed to the target node selecting a destination intersection from candidate neighbor intersections as a function of traffic conditions;
- a step of seeking one or more neighbor mobile nodes of the carrier node of the data packet nearer the selected destination intersection than the carrier node;
- if one or more neighbor mobile nodes is found, a step of transferring the data packet from the carrier node of the data packet to said neighbor node that has been found so as to route said data packet toward the selected destination intersection.

The routing method of the invention progressively routes data packets by successive transfer from node to node toward the target node, each node selecting an intermediate destination intersection through which the data packets must pass in transit. Thus the route taken by the data packets across the particular geographical network is determined progressively, enabling virtually instantaneous tracking of changes to the topology of ad hoc networks in which mobile nodes are constantly on the move.

By determining the route progressively, the method of the invention enables packets to be transmitted over much greater distances than existing routing protocols. The greater the distance between the source node and the target node, the greater the transmission time between those two nodes. The greater the transmission time, the higher the probability of changes to the topography of the ad hoc network. Without frequent calculation of the routing path, the rate of loss of packets to be transmitted to the target node quickly reaches a high value, as in existing protocols.

Progressive routing based on local routing information reduces the size of the headers of the data packets used to route the data, in contrast to routing protocols that maintain up-to-date global geographical location information and calculate an entire routing path.

This makes very efficient use of the resources of the ad hoc network, in particular minimizing the bandwidth allocated to the network.

What is more, the routing method of the invention enables data packets to be routed from a source node to a target node with a minimum end-to-end delay combined with a low data packet loss rate. Note that the target node can be fixed (for example a reception point in a service station) or mobile (for example a moving vehicle).

The routing method of the invention is therefore particularly suitable for ad hoc networks in which the nodes are constantly moving fast, changes of network topology are frequent, and the durations of the connections between mobile nodes are short (especially on multihop paths).

Moreover, by taking account of traffic conditions, it limits the risk of interruption of packet routing caused by insufficient traffic on a selected traffic route.

According to one feature of the method of the invention the step of selecting a new destination intersection is executed if the carrier node of the data packet is located at the selected destination intersection, referred to as the current intersection.

This optimizes the calculation load on the nodes by limiting execution of this step to nodes that have come into the vicinity of the current destination intersection.

According to one feature of the method of the invention, during the selection step the carrier mobile node of the data packets selects a destination intersection from the candidate intersections as a function of one or more real time traffic conditions on a traffic route connecting the candidate intersection to the current intersection.

Taking account of real time mobile node traffic conditions makes it certain that a traffic route between the intersection at which the mobile node is currently located and the candidate destination intersection will be selected and minimizes connectivity problems, thereby reducing routing latency and the packet loss rate.

For example, the denser the node traffic on a traffic route, the higher the level of connectivity thereon and, consequently, the greater the number of packets in transit on this route likely to reach the destination intersection in a minimum time.

According to another feature of the invention, the carrier mobile node selects the destination intersection from the candidate intersections as a function of the proximity of the candidate intersection to the target node.

The carrier mobile node therefore selects the destination intersection that is geographically nearest the target node and in the direction of which traffic conditions are optimum.

According to another feature of the invention, each node maintains up to date at least one of the parameters belonging to the group comprising the position, speed and direction of movement of its near neighbor nodes.

According to another feature of the invention, the carrier node selects a neighbor mobile node as a function of the speed of the neighbor node and/or its progress toward the selected destination intersection.

By taking account of the speed vector (amplitude and direction) and the position of each of its neighbor nodes, a carrier node determines the neighbor node that is nearest the destination intersection by means of an estimation calculation. For example, the neighbor node selected by the carrier node is that nearest the destination intersection and moving toward it at the highest speed.

According to another feature of the invention, each node maintains up-to-date measurements relating to the position, speed and direction of movement of its neighbor nodes and the step of seeking one or more neighbor mobile nodes of the carrier node of the data packet nearer the selected destination intersection than the carrier node includes a prediction step in which the current position of a neighbor node is predicted at a current time from these measurements.

According to another feature of the invention, the carrier mobile node of the data packet selects from the candidate intersections the destination intersection having a maximum score Sj, that score being calculated using the following formula:

$$Sj = \alpha \times f(T_{ij}) + \beta \times g(D_j), \text{ where}$$

$T_{ij}$ represents the traffic density of nodes between the current intersection and the destination intersection;

$D_j$ represents the distance along the curve of the routing path that connects the destination intersection to the target node;

$\alpha$ and $\beta$ represent correction factors;

f is a density function of the road traffic such that $0 \leq f(T_{ij}) \leq 1$; and $$g(D_j) = 1 - \frac{D_j}{D_i},$$

such that $-1 \leq g(D_j) \leq 1$, where Di is the distance between the current intersection and the target node.

Another aspect of the invention is directed to a communications terminal adapted to be used by a mobile node of an ad hoc network for routing data packets to a target node of the ad hoc network, said ad hoc network comprising a plurality of mobile nodes moving on traffic routes of a particular geographical network forming between them a plurality of intersections. The terminal of the invention includes:

means for selecting a destination intersection from neighbor intersections as a function of traffic conditions;

means for seeking a neighbor mobile node nearer the selected destination intersection than said mobile node;

means for transferring the data packets to the neighbor mobile node that has been found if the result of the search is positive.

The particular embodiments and advantages of this terminal are the same as those of the method of the invention described above.

According to another feature of the invention, the terminal of the invention includes means for selecting the destination intersection as a function of its proximity to the target node.

According to another feature of the invention, the terminal of the invention includes means for keeping up to date positions, speeds and directions of movement of its near neighbor nodes.

According to another feature of the invention, the terminal of the invention includes means for selecting a neighbor mobile node as a function of the speed of that node and/or its progress toward the selected destination intersection.

The invention is also directed to a wireless communications system comprising mobile nodes interconnected in an ad hoc structure and moving on traffic routes of a particular geographical network forming between them intersections, in which system the nodes are equipped with a communications terminal as described above.

In such systems, a data packet to be routed to a target node is progressively routed toward that target node by successive node-to-node hops on traffic routes on which there are sufficient mobile nodes to provide adequate connectivity.

Alternatively, the various steps of the data packet routing method described above are determined by instructions of computer programs.

Consequently, another aspect of the invention is directed to a computer program including instructions for executing the steps of the data packet routing method described above when that program is executed by a computer.

This program can use any programming language and take the form of source code, object code or an intermediate code between source code and object code, such as a partially compiled form, or any other desirable form.

Another aspect of the invention is directed to a computer-readable storage medium storing a computer program including instructions for executing the steps of the data packet routing method described above.

The information medium can be any entity or device capable of storing the program. For example, the medium can include storage means, such as a ROM, for example a CD ROM or a microelectronic circuit ROM, or magnetic storage means, for example a diskette (floppy disk) or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit into which the program is incorporated, the circuit being adapted to execute the data packet routing method of the invention or to be used in its execution.

BRIEF DESCRIPTION OF THE DRAWINGS

Other features and advantages of the present invention emerge from the following description with reference to the appended drawings, which show one non-limiting embodiment of the invention and in which.

DETAILED DESCRIPTION OF ONE EMBODIMENT

The invention is described in detail below in the context of an intervehicular ad hoc network intended in particular to provide high-connectivity services, such as web browsing, instant messaging, file sharing and real-time gaming. The protocol of the invention is equally suitable for applications such as road safety or cooperative driving.

Figure 1:
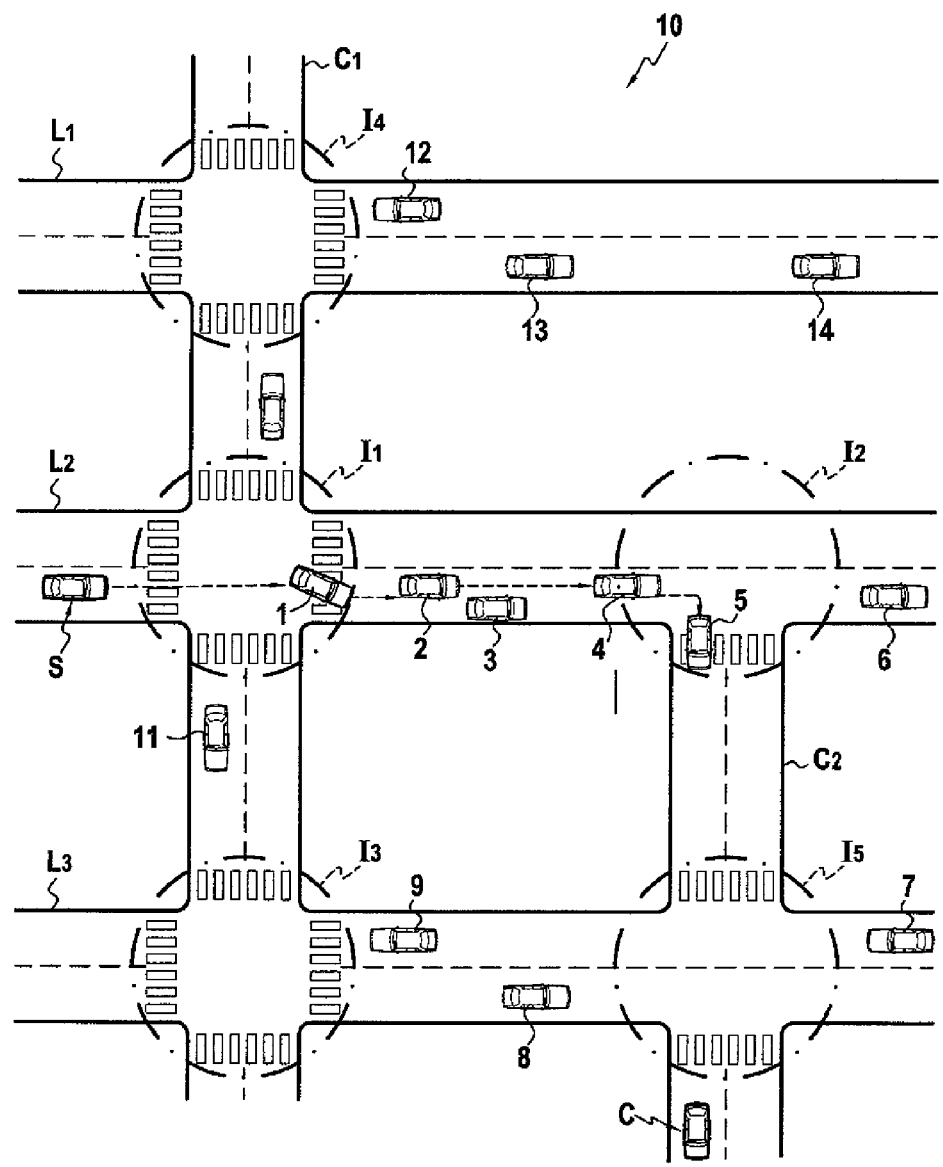
FIG. 1 is a diagram showing a road network in which vehicles of an ad hoc network circulate.

FIG. 1 is a diagram showing an ad hoc network comprising a plurality of vehicles 1 to 14 moving on traffic routes L1, L2, L3, C1, C2 of a particular road network 10, a source vehicle S sending data packets P, and a target vehicle for which the data packet P is intended.

In the FIG. 1 road map the road network 10 includes "horizontal" traffic routes L1, L2, L3 and "vertical" traffic routes C1, C2, these routes L1, L2, L3, C1, C2 defining a plurality of intersections I1, I2, I3, I4, I5. In this example, for reasons of simplicity, traffic routes that cross at right angles are shown. However, the invention applies without distinction to any traffic plan configuration including in particular traffic routes at any angle to each other.

Each vehicle of the ad hoc network is equipped with a geographical positioning device, for example a GPS (Global Positioning System) receiver coupled to a GLS (Grid Location Service) so that each vehicle of the ad hoc network can be located. The GPS receiver enables a vehicle to determine its own geographical position while the GLS service provides the instantaneous geographical position of the other vehicles and in particular that of the target vehicle C.

Moreover, each vehicle is adapted to determine the position of near neighbor intersections on the basis of location information combined with predefined road maps. For this purpose, each vehicle can be equipped with a standard onboard navigation device containing prestored (preloaded) digital road maps relating to the road network 10.

Each vehicle has information regarding the road traffic around each of these neighbor intersections. For example, this information can be provided by a beacon message transmitted by each vehicle to its neighbors periodically (for example every second). Alternatively, road traffic sensors (not shown) installed at each intersection could provide any vehicle in the vicinity of the intersection with information on road traffic conditions.

Figure 2:
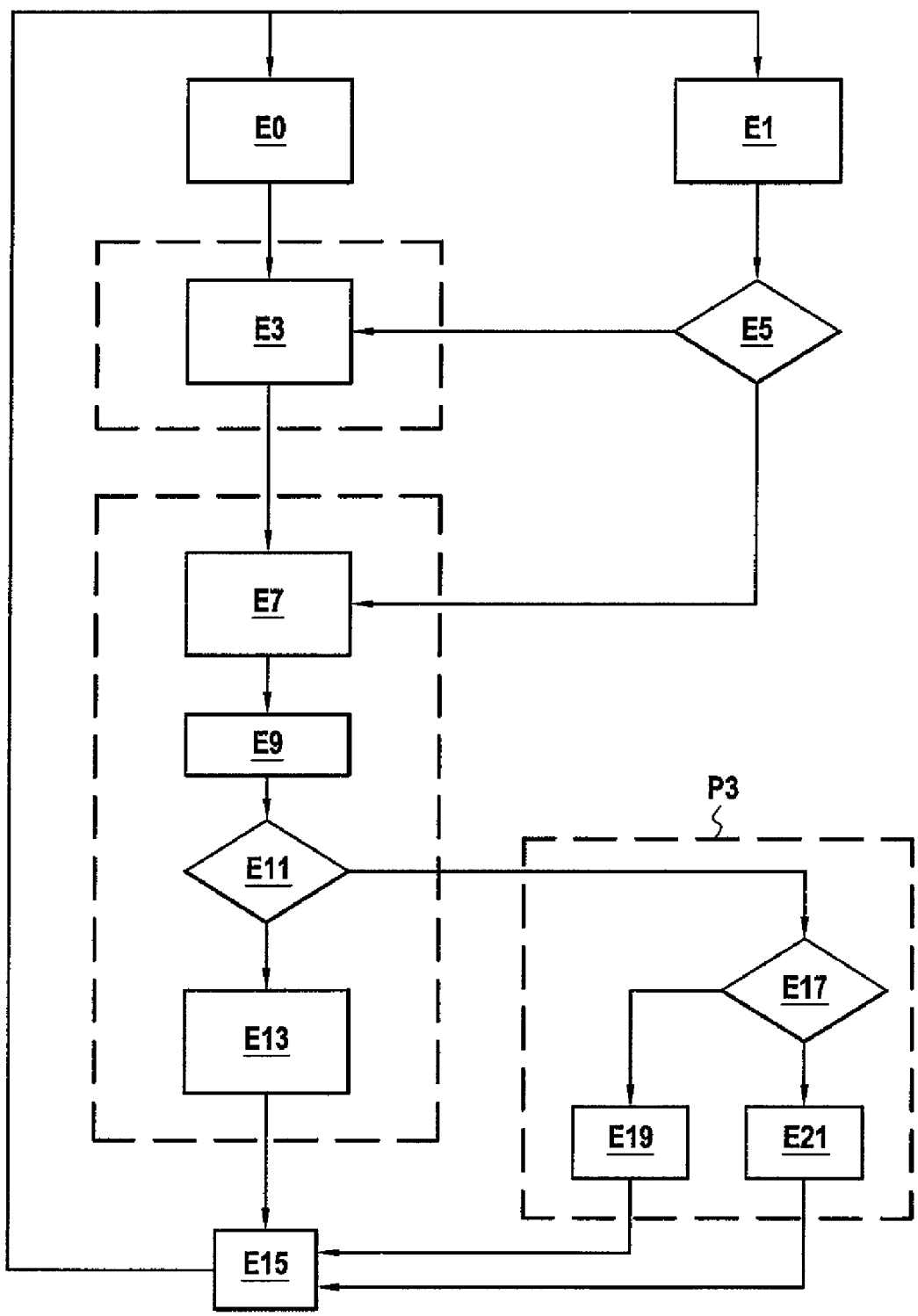
FIG. 2 is a flowchart showing one iteration of one embodiment of a data packet routing method of the invention.

FIG. 2 is a flowchart showing one iteration of one embodiment of a data packet routing method of the invention.

Firstly, there are two different situations with regard to the initial step of the routing method.

In a first situation, the source vehicle S is seeking to send data packets P to the target vehicle C during an initial step E0.

In the second situation, the data packets P have already been sent by the source vehicle S and received by a vehicle referred to below as the "carrier vehicle" during an initialization step E1.

In the first situation, the source vehicle S selects during a selection step E3 a destination intersection to which the data packets P will be routed. This selection step E3 is described in detail below with reference to FIG. 3.

As soon as a destination intersection has been selected, the data packets P are forwarded toward that destination intersection, as described in relation to the subsequent steps of the method. The source node is referred to below as the carrier node of the data packet.

Thus the data packets P are marked with the geographical position of the selected destination intersection, for example in their header. Each vehicle of the ad hoc network keeps an up-to-date "neighbor table" which stores information relating to its near neighbors, such as their position, speed (amplitude) and direction of movement at a given time. These neighbor tables can be updated by each vehicle sending a beacon message to its neighbors periodically, for example. Thus each vehicle of the ad hoc network 10 sends a beacon message to all its neighbors at regular time intervals Δt (for example Δt=1 s).

The term "neighbor" refers to a vehicle that is within radio range of the carrier vehicle of the data packet P. The term "near neighbor" refers to a neighbor vehicle that is at a sufficiently short distance from the carrier vehicle to ensure the required transmission quality or quality of service (for example by complying with a predetermined signal-to-noise ratio threshold parameter).

The next step is a step E7 of seeking near neighbors.

In the second situation, i.e. if the data packets P have already been sent by the source vehicle S and received by a carrier vehicle during the initialization step E1, a step E5 verifies whether the carrier vehicle is located at the destination intersection. The expression "located at the destination intersection" means that the carrier vehicle is located within a predefined area encompassing the destination intersection, for example a circle of predetermined radius having the destination intersection for its center.

If this is not so, i.e. if the carrier vehicle is not located at the destination intersection, the next step is the search step E7.

If it is so, i.e. if the carrier vehicle is located at the destination intersection, the carrier vehicle selects during a selection step E3 a destination intersection to which the data packets P will be routed, and the data packets P are forwarded toward that destination intersection. The next step is then the search step E7.

The search step E7 seeks neighbors of the carrier vehicle of the packets P to be forwarded. The above-mentioned neighbor tables can be updated during this step.

Then, during a prediction step E9, the position of the neighbor vehicles at the current time t2 after the time t1 is estimated from information most recently stored at time t1 in the above-mentioned neighbor tables (speed, direction of movement and last known position at time t1). This predicts the current position of the neighbor vehicles detected during the search step E7, i.e. their position at the current time t2.

For this purpose it is assumed that each of the vehicles is moving at a constant speed equal to that previously detected and stored at the time t1, for example.

The steps E7 and E9 then seek at least one mobile node 2, 3 that is a neighbor of the carrier node 1 of the data packet P and nearer the selected destination intersection than the carrier node.

A test step E11 determines, on the basis of the positions estimated during the preceding prediction step E9, whether there is at least one neighbor vehicle whose distance from the destination intersection at the time t2 is less than the distance between the carrier vehicle and the same intersection, to which the carrier vehicle can then transfer its packets P.

If it is estimated that two or more of the vehicles would be located nearer the destination intersection than the carrier vehicle itself at the time t2, then the vehicle for which this distance is the shorter or shortest is selected.

If such a neighbor vehicle exists, the carrier vehicle sends the data packets P to it in a transmission step E13, thereby marking the end of one iteration of the method of the invention (step E15).

Otherwise, i.e. if there is no neighbor vehicle that would be nearer the destination intersection than the carrier vehicle, then a test step E17 determines whether the carrier vehicle of the packet P is sufficiently near the destination intersection.

A reference travel time upper limit corresponding to a fixed delay is defined for this purpose, for example, and is compared to the estimated travel time of the carrier vehicle to reach the destination intersection. This upper limit is chosen to produce a delay that is acceptable given the required quality of service.

If it is estimated that the carrier vehicle is sufficiently near the destination intersection, the vehicle carries the packet P to the destination intersection in a step E19.

An iteration of the routing method of the invention ends as soon as the carrier vehicle of the packet P reaches the selected destination intersection. The next step is then the step E15.

Otherwise, i.e. if it is estimated that the carrier vehicle of the data packet P is not sufficiently near the destination intersection concerned, the vehicle carries the packet in the direction of that intersection in a step E21:

until it reaches the destination intersection; or until another vehicle nearer the destination intersection enters its transmission field/domain.

The next step is then the step E15.

In the step E15, a new iteration begins from the step E1.

An illustrative embodiment of the routing method of the invention described with reference to FIG. 2 is described below with reference to FIG. 1.

A source vehicle S moving on a traffic route L2 is seeking to send a packet P to a target vehicle C moving on a traffic route C2. For this purpose, it is assumed that it sends the packet P to a first vehicle 1 located at a first intersection I1, which is the intersection nearest the source vehicle S. Obviously, it is also assumed that the first vehicle 1 is within radio range of the source vehicle S.

The first vehicle 1 receives the packet P in an initial step E1. Located at an intersection I1 called the first intersection (positive response to the test E5), it selects a destination intersection in the selection step E3.

In this embodiment, the first vehicle 1 selects as the destination intersection a second intersection I2 because it is nearer the target vehicle C and there is dense road traffic between the first intersection I1 and the second intersection I2.

After selecting the second intersection I2 as the destination intersection, the first vehicle 1 marks the packet P with the position of the second intersection I2. The first vehicle 1 then transfers the data packet P to a second vehicle 2 in a step E13.

For this purpose, it detects its nearest neighbors in a search step E7. In this embodiment, it detects the presence of a second moving vehicle 2 and a third moving vehicle 3, both these vehicles being sufficiently near the first vehicle 1 to receive an electromagnetic signal carrying the data to be transmitted sent by the vehicle 1.

In the prediction step E9, the first vehicle 1 calculates the positions of the second vehicle 2 and the third vehicle 3 at a later time t2 from position and speed information relating to the two vehicles 2, 3 contained in its neighbor table, which is kept up to date. This example assumed that the third vehicle 3 is moving more slowly than the second vehicle 2.

In a test step E11, the first vehicle 1 decides to send its packet P to the second vehicle 2 even though, according to information contained in its neighbor table, the vehicle 2 is farther from the second intersection I2 than the third vehicle 3. This choice is motivated by the fact that the third vehicle 3 is moving toward the second intersection I2 more slowly than the second vehicle 2 and that consequently it is highly probable that, after their current positions are predicted, the second vehicle 2 will be nearer the second intersection I2 than the third vehicle 3.

After sending the packet P in a step E13, a first iteration of the method of the invention ends (step E15). The method is then iterated for each vehicle forwarding the data packet P.

The packet P is received by the second vehicle 2 in the initial step E1 which initiates a new iteration of the method described above, now applying to the second vehicle 2. At the end of this iteration, the second vehicle 2 transfers the packet P to a fourth vehicle 4 at the second intersection I2. Being located at an intersection, the fourth vehicle 4 selects in the selection step E3 a new destination intersection (fifth intersection I5) and in the step E13 transfers the packet P to a fifth vehicle 5 moving toward the target vehicle C on the traffic route C2.

In this example, the fifth vehicle 5 is the only vehicle between the fourth intersection I4 and the fifth intersection I5 moving toward the latter intersection I5. Consequently, the second vehicle 2 does not detect a nearest neighbor that is nearer the fifth intersection I5 than the fifth vehicle 5.

In other words, the situation is a "local optimum" situation. Consequently, the recovery strategy of the invention is applied in a recovery phase P3 comprising the steps E17, E19 or E17, E21 already described. Accordingly, in the step E21, the fifth vehicle 5 carries the packet P as far as the fifth intersection I5.

Finally, it is assumed that when the fifth vehicle 5 reaches the fifth intersection I5 it is in radio range of the target vehicle C and so can transmit the packet P to it directly, with no further forwarding.

Figure 3:
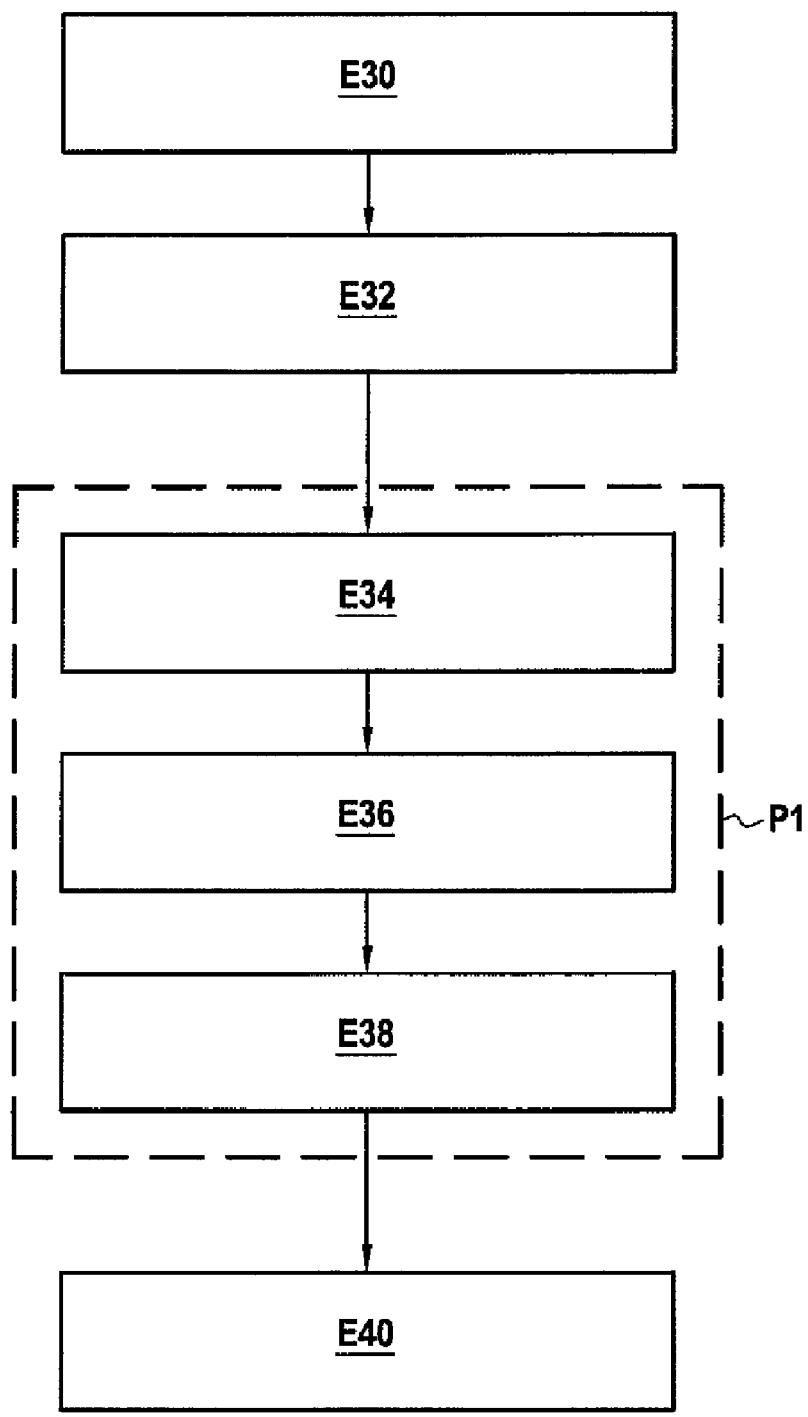
FIG. 3 is a flowchart showing the steps of one embodiment of the invention that select a destination intersection.

FIG. 3 is a flowchart showing the steps executed to enable a carrier vehicle of a data packet P to select a destination intersection.

In an initial step E30, the carrier vehicle of the packet P reaches an intersection Ii below referred to as the "current intersection".

During a next step E32, the vehicle determines the position of near neighbor intersections. This determination step E32 is based on geographical information from a digital road map preloaded into a standard onboard navigation device, for example, taking account of the instantaneous position of the vehicle in question and the position of the target vehicle C.

For each located neighbor intersection Ij, there is executed a phase P1 of calculating a score Sj described below and used to select the destination intersection to which the packet P must be routed.

Accordingly, the calculation phase P1 is iterated as many times as the number of neighbor intersections detected. In this example, the score Sj calculated for each candidate destination intersection Ij depends on two parameters in particular: a road traffic density and a geometrical distance.

The calculation phase P1 includes a first step E34 of obtaining information relating to the existing road traffic on the traffic route connecting the current intersection Ii to a neighbor destination intersection Ij. This information consists of the real time road traffic density on this route, constituting a first parameter to be taken into account in calculating the score Sj of a candidate destination intersection Ij, this parameter being denoted $T_{ij}$ below.

In a second step E36, the distance between the target vehicle C and the candidate destination intersection Ij is determined. This distance, denoted Dj below, constitutes a second parameter to be taken into account in calculating the score Sj of the destination intersection Ij.

For example, this distance Dj is calculated from geographical information from a digital road map preloaded into a standard onboard navigation device and correlated with position information for the target vehicle C, which is updated regularly.

The score Sj of the candidate destination intersection Ij is calculated in a third step E38.

This score Sj includes a first component $f(T_{ij})$ linked to the road traffic density ($T_{ij}$) and a second component $g(D_j)$ linked to the distance ($D_j$), these two components being referred to as the "traffic score" and the "distance score", respectively.

The score Sj of the candidate destination intersection Ij is calculated from the following formula (equation 1):

$$Sj = \alpha \times f(T_{ij}) + \beta \times g(D_j), \text{ where}$$

$T_{ij}$ represents the road traffic density on the traffic route connecting the current intersection Ii to the candidate destination intersection Ij;

$D_j$ represents the distance along the curve of the routing path connecting the candidate destination intersection Ij to the target vehicle C; and $\alpha$ and $\beta$ are correction factors for assigning a specific weight to each of the two components of the score Sj (for example, if greater importance is to be given to the road traffic density $T_{ij}$ than to the distance $D_j$, values of $\alpha$ and of $\beta$ are chosen such that $\alpha > \beta$).

The traffic score $f(T_{ij})$ is obtained by comparing the current number X of vehicles moving between the current intersection Ii and the destination intersection Ij to a reference minimum number N of vehicles enabling continuous transmission of data packets. This reference number corresponds to N vehicles with exactly the same radio range regularly distributed between the current intersection Ii and the destination intersection Ij so that two successive vehicles are separated by a distance equal to twice the radius of the radio range of a vehicle.

Accordingly, the reference number N can be defined as follows:

$$N = \text{Int}\left\{\frac{D_{ij}}{2 \times R}\right\}, \text{ where}$$

$D_{ij}$ represents the distance between the current intersection Ii and the destination intersection Ij;
R represents the radius of the radio range of a vehicle (assumed to be identical for all vehicles); and
Int { } is the function that determines the integer part of its argument.

Different values of the traffic score are defined that each correspond to a traffic density level, as shown in Table 1 below. According to this table, if the number X of vehicles is between N and 2.N, the traffic score assigned is 0.6, which corresponds to a moderately-high traffic density.

TABLE 1

| Number of vehicles (X) | Traffic density | Traffic score |
|---|---|---|
| 0 ≦ X < N/4 | very low | 0.0 |
| N/4 ≦ X < N/2 | low | 0.2 |
| N/2 ≦ X < N | moderate | 0.4 |
| N ≦ X < 2.N | moderately high | 0.6 |
| 2.N ≦ X ≦ 3.N | high | 0.8 |
| X ≧ 3.N | very high | 1 |

The distance score is determined from the following formula:

$$g(D_j) = 1 - \frac{D_j}{D_i}$$

(equation 2), such that $-1 \leq g(D_j) \leq 1$, where Di is the distance between the current intersection Ii and the target vehicle C.

Accordingly, if the candidate intersection Ij is nearer the target vehicle than the current intersection Ii (in other words if Dj<Di), a positive distance score is obtained. In contrast, if the candidate intersection Ij is farther from the target vehicle C (i.e. if Dj>Di), a negative distance score is obtained, which is a disincentive to choosing that intersection.

After the score Sj has been calculated for each destination intersection Ij, the destination intersection Ij with the maximum score Sj is selected in a selection step E40.

The destination intersection selected is the intersection that is geographically nearest the target vehicle C and has the highest road traffic level (or density).

One non-limiting example of selecting a destination intersection in a particular configuration of an urban intervehicular ad hoc network is described below with reference to FIGS. 3 and 4.

Figure 4:
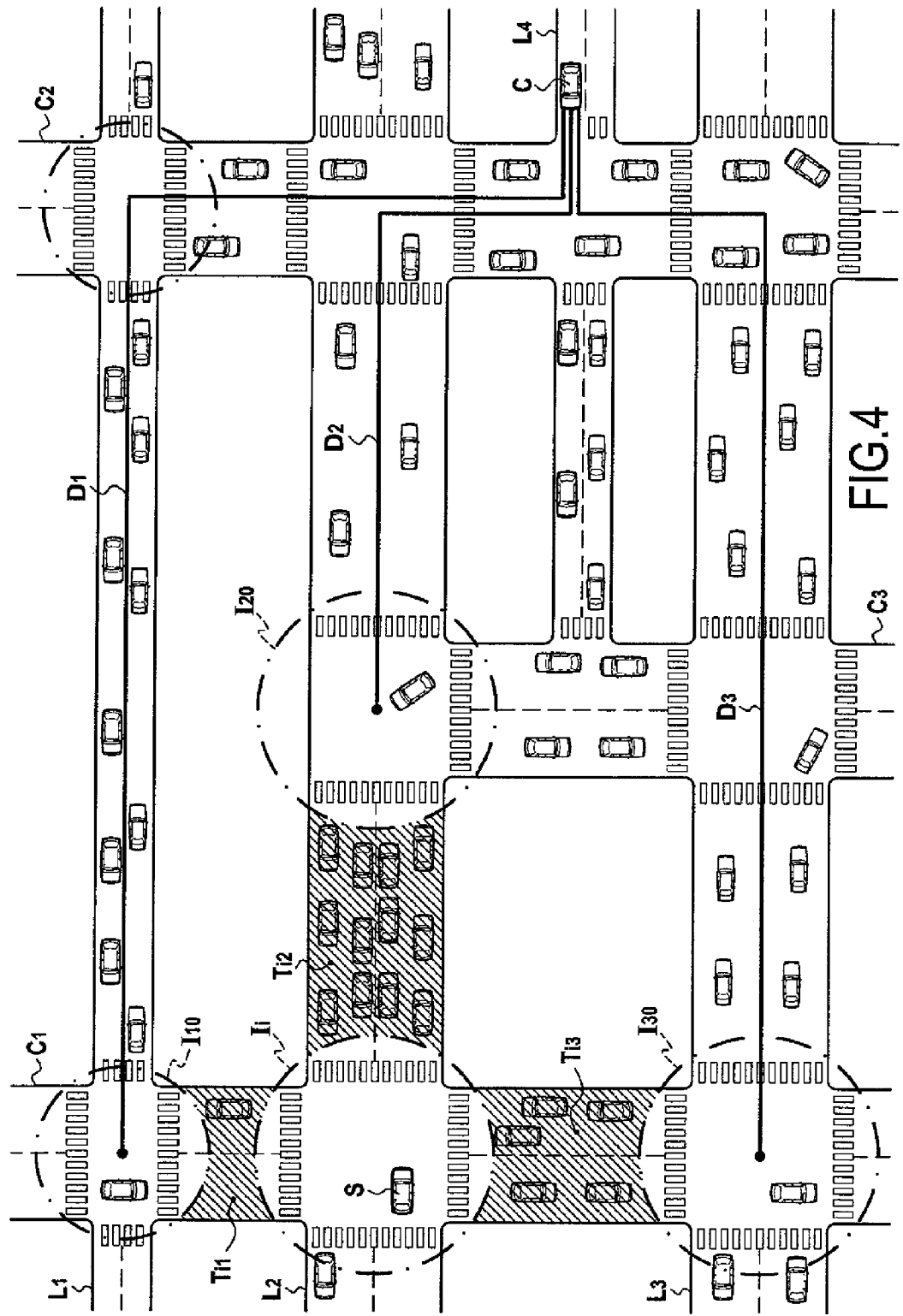
FIG. 4 is a diagram showing one example of selecting a destination intersection in a particular configuration of an urban intervehicular ad hoc network.

FIG. 4 is a diagram representing a road network 10 similar to that of FIG. 1, comprising traffic routes L1, L2, L3, C1, C2, C3 defining intersections Ii, I10, I20, I30 between them. The entities represented on these traffic routes are vehicles that form an ad hoc network and forward a data packet P between a source vehicle S and a target vehicle C.

The source vehicle S reaching an intersection Ii is considered to be seeking to transmit the data packet P to the target vehicle C. A carrier vehicle of the data packet P to be forwarded could obviously be considered in an equivalent way.

For this purpose, the source vehicle S must choose a routing direction for the packet P by selecting a destination intersection.

In the determination step E32 already described, the source vehicle S detects three destination intersections which at the time are candidate destination intersections for routing the data packet P: a first intersection I10, a second intersection I20, and a third intersection I30 (see FIG. 4).

To determine to which destination intersection the packet P should be routed, the source vehicle S calculates the scores Sj of these three intersections in the calculation phase P1 described above.

The respective scores of the first, second, and third candidate destination intersections I10, I20, I30 are S1, S2, S3.

As shown in FIG. 4, the traffic conditions in this example are such that the road traffic Ti2 (shaded area in FIG. 4) on the portion of the traffic route L2 connecting the current intersection Ii to the second destination intersection I20 is denser than the road traffic Ti3 on the portion of the traffic route C1 connecting the current intersection Ii to the third destination intersection I30, which itself is denser that the road traffic Ti2 on the portion of the traffic route C1 connecting the current intersection Ii to the first destination intersection I10. In other words (not indicated in FIG. 4): Ti2>Ti3>Ti1.

As shown in FIG. 4, the second destination intersection I20 is the destination intersection nearest the target vehicle C. The distance D2 along the curve between the second destination intersection I20 and the target vehicle C is less than the distance D3 along the curve between the third intersection I30 and the target vehicle C, which itself is less than the distance D1 along the curve between the first destination intersection I10 and the target vehicle C. In other words: D2<D3<D1.

Given that it is nearest the target vehicle C and has the highest traffic density, the second destination I20 therefore obtains the highest score S2 (S2>S3>S1).

It is therefore to this intersection I20 that the data packet P is routed via numerous vehicles moving toward that intersection.

An example of forwarding a data packet P in accordance with one particular embodiment of the invention via vehicles located between two successive intersections is described below with reference to FIGS. 5A and 5B.

Figure 5A:
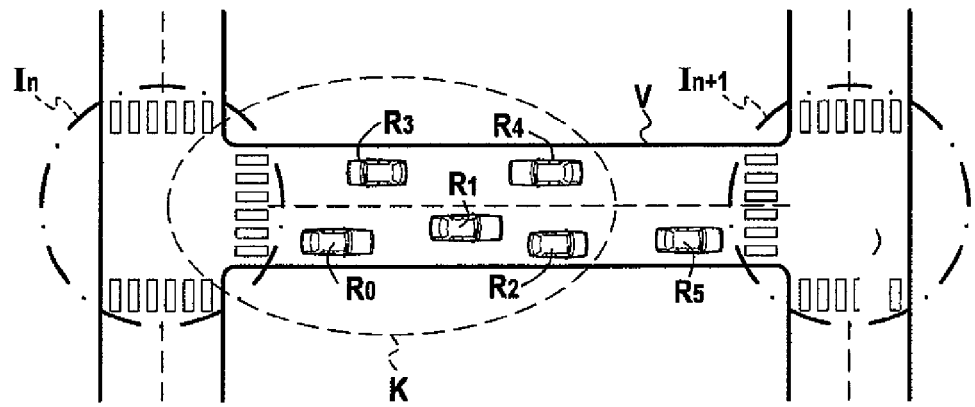
FIGS. 5A and 5B are diagrams showing the forwarding of data packets P between two successive intersections in one embodiment of the invention.

FIG. 5A represents a traffic route V between two consecutive intersections $I_n$ and $I_{n+1}$ at a given time $N_1$.

Figure 5B:
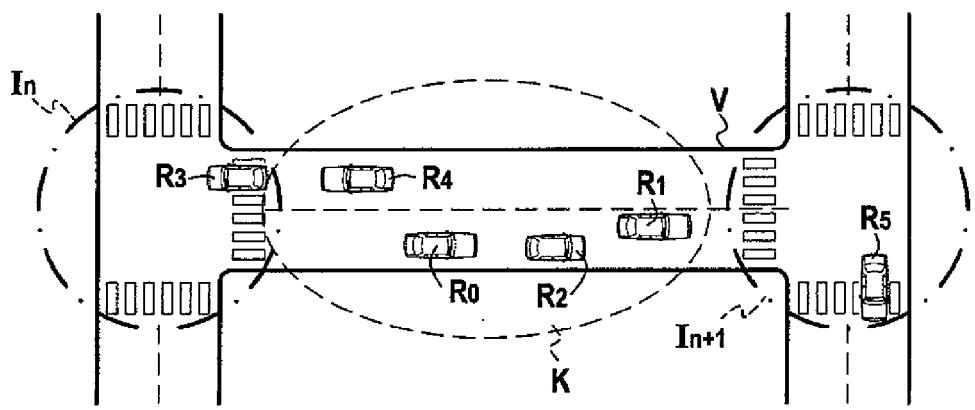

FIG. 5B shows the same traffic route V as FIG. 5A at a later time $N_2$ such that $N_2 > N_1$. This new configuration is obtained by the FIG. 2 prediction step E9, which estimates the current position of the vehicles traveling on this traffic route from information on their position and speed stored and kept up to date by each mobile node.

In this example, a carrier vehicle R0 of the data packet P moving on the route V toward the destination intersection $I_{n+1}$ is considered to be seeking to forward that packet towards the destination intersection $I_{n+1}$. In accordance with the invention, the carrier vehicle R0 uses for this purpose vehicles moving on the route V to the destination intersection $I_{n+1}$.

As shown in FIGS. 5A and 5B, four vehicles (R1, R2, R3, R4) are within the radio range K of the carrier vehicle R0.

The carrier vehicle R0 is therefore able to communicate with one or more of these vehicles to route the data packet P toward the destination intersection $I_{n+1}$.

In FIG. 5A it is assumed, for example, that at time $N_1$:
the first and second vehicles R1 and R2 are moving on the traffic route V in the same direction as the carrier vehicle R0, i.e. toward the destination intersection $I_{n+1}$;
the first vehicle R1 is moving faster than the second vehicle R2; and
the third and fourth vehicles R3 and R4 are moving on the traffic route V in the opposite direction to the carrier vehicle R0.

According to the routing protocol of the invention, the carrier vehicle R0 transfers the data packet P to the first vehicle R1 because it estimates that, at the time $N_2$, the first vehicle R1 will have reached a position nearest the destination intersection $I_{n+1}$, as shown in FIG. 5B.

However, note that without this prediction step, which takes account in particular of the speed and the direction of movement of the neighbor vehicles, the carrier vehicle R0 would have chosen to transfer its packet P to the fourth vehicle R4, given that at time $N_1$ the vehicle nearest the destination intersection $I_{n+1}$, is the fourth vehicle R4.

The prediction step of the invention advantageously takes into consideration the fact that the fourth vehicle R4 and the third vehicle R3 are moving in the opposite direction to the carrier vehicle R0. Because of this, the carrier vehicle R0 excludes these two vehicles from consideration for forwarding the packet P.

An example of implementing the recovery strategy in one particular embodiment of the invention is described below with reference to FIGS. 6A and 6B.

Figure 6A:
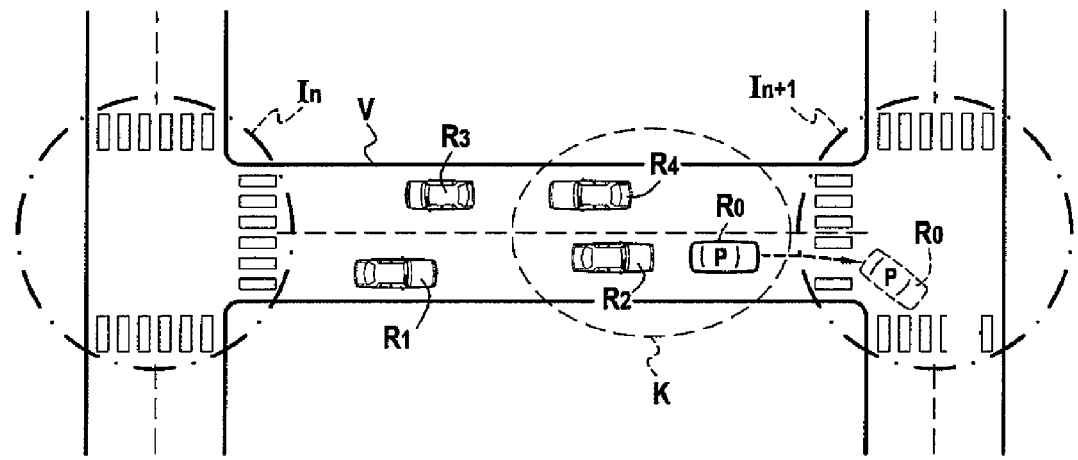
FIGS. 6A and 6B are diagrams showing one example of use in one embodiment of the invention of a recovery strategy in the presence of a local optimum situation.

The FIG. 6A example illustrates the situation where, at time $N_1$, a carrier vehicle R0 seeking to forward a packet P finds no moving neighbor vehicle between the carrier vehicle R0 and the destination intersection $I_{n+1}$.

In this situation, a recovery solution conforming to the method of the invention is used to prevent the packet P getting stuck in a "local minimum" situation, the carrier vehicle R0 being the vehicle nearest the destination intersection $I_{n+1}$.

This solution entails the carrier vehicle R0 carrying the packet P as far as the destination intersection $I_{n+1}$. This strategy can be envisaged provided that the carrier vehicle R0 is not too far from the destination intersection $I_{n+1}$ (step E19 in FIG. 2).

Figure 6B:
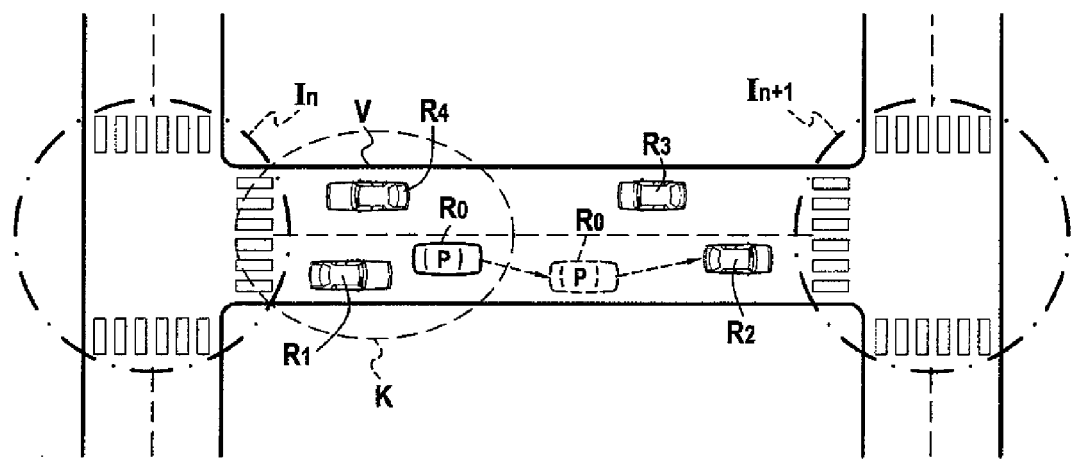

The FIG. 6B example shows the use of a variant of the above recovery solution whereby the carrier vehicle R0 carries the packet P until an appropriate vehicle enters its radio range and the packet P can therefore be transferred to it.

This variant is used in particular if the carrier vehicle R0 is not sufficiently near the destination intersection $I_{n+1}$ (step 21 in FIG. 2).

The invention claimed is:

1. A method of routing one or more data packets between a source node and a target node in an ad hoc network comprising a plurality of mobile nodes moving on traffic routes of a particular geographical network forming between them a plurality of intersections, wherein the method comprises:

a step of a carrier node of a data packet to be routed to the target node selecting a destination intersection from candidate neighbor intersections as a function of traffic conditions;

a step of seeking one or more neighbor mobile nodes of the carrier node of the data packet nearer the selected destination intersection than the carrier node; and if one or more neighbor mobile nodes is found, a step of transferring the data packet from the carrier node of the data packet to said neighbor node that has been found so as to route said data packet toward the selected destination intersection, wherein a step of selecting a new destination intersection is executed if the carrier node of the data packet is located at the selected destination intersection, referred to as a current intersection, and wherein during the selection step the carrier node of the data packet selects a destination intersection from the candidate neighbor intersections as a function of one or more real time traffic conditions on a traffic route connecting the respective candidate intersection to the current intersection.

2. The method according to claim 1, wherein said carrier node selects the destination intersection from the candidate neighbor intersections as a function of the proximity of the candidate neighbor intersection to the target node.

3. The method according to claim 1, wherein if no neighbor mobile node is found in the search step, the carrier node carries the packet until it detects a new neighbor node.

4. A computer program stored on a computer memory and executing on a processor, which when used on a communications terminal causes the processor to execute the steps of the routing method according to claim 1.

5. A non-transitory computer-readable storage medium storing a computer program comprising instructions for executing the steps of the routing method according to claim 1.

6. A method of routing one or more data packets between a source node and a target node in an ad hoc network comprising a plurality of mobile nodes moving on traffic routes of a particular geographical network forming between them a plurality of intersections, wherein the method comprises:

a step of a carrier node of a data packet to be routed to the target node selecting a destination intersection from candidate neighbor intersections as a function of traffic conditions;

a step of seeking one or more neighbor mobile nodes of the carrier node of the data packet nearer the selected destination intersection than the carrier node; and if one or more neighbor mobile nodes is found, a step of transferring the data packet from the carrier node of the data packet to said neighbor node that has been found so as to route said data packet toward the selected destination intersection, wherein each node maintains measurements relating to the position, speed and direction of movement of its neighbor nodes and the step of seeking one or more neighbor mobile nodes of the carrier node of the data packet nearer the selected destination intersection than the carrier node includes a prediction step in which the current position of a neighbor node is calculated at a current time from the measurements.

7. A method of routing one or more data packets between a source node and a target node in an ad hoc network comprising a plurality of mobile nodes moving on traffic routes of a particular geographical network forming between them a plurality of intersections, wherein the method comprises:

a step of a carrier node of a data packet to be routed to the target node selecting a destination intersection from candidate neighbor intersections as a function of traffic conditions;

a step of seeking one or more neighbor mobile nodes of the carrier node of the data packet nearer the selected destination intersection than the carrier node; and if one or more neighbor mobile nodes is found, a step of transferring the data packet from the carrier node of the data packet to said neighbor node that has been found so as to route said data packet toward the selected destination intersection, wherein said carrier node selects from the candidate neighbor intersections the destination intersection having a maximum score (Sj), the maximum score being calculated using the following formula:

$$Sj = \alpha \times f(T_{ij}) + \beta \times g(D_j), \text{ where}$$

$T_{ij}$ represents the traffic density of nodes moving between a current intersection and the destination intersection;

$D_j$ represents the distance along the curve of the routing path that connects the destination intersection to the target node;

α and β represent correction factors;

f is a density function of the road traffic such that $0 \leq f(T_{ij}) \leq 1$; and $$g(D_j) = 1 - \frac{D_j}{D_i},$$

such that $-1\ g(Dj) \leq 1$, where Di is the distance between the current intersection and the target node.

8. A communications terminal adapted to be used by a mobile node of an ad hoc network for routing data packets to a target node of the ad hoc network, said ad hoc network comprising a plurality of mobile nodes moving on traffic routes of a particular geographical network forming between them a plurality of intersections, wherein said terminal comprises:

means for selecting a destination intersection from neighbor intersections as a function of traffic conditions;

means for seeking a neighbor mobile node nearer the selected destination intersection than said mobile node; and means for transferring the data packets to the neighbor mobile node that has been found if the result of the search is positive, wherein a new destination intersection is selected if the mobile node of the data packet is located at the selected destination intersection, referred to as the current intersection, and wherein during the selection of the new destination intersection, the mobile node of the data packet selects a destination intersection from the candidate neighbor intersections as a function of one or more real time traffic conditions on a traffic route connecting the respective candidate neighbor intersection to the current intersection.

9. A wireless communications system comprising mobile nodes interconnected in an ad hoc structure and moving on traffic routes of a particular geographical network forming between them intersections, wherein said nodes are equipped with a communications terminal according to claim 8.

* * * * *